(12) United States Patent
Shrivastava et al.

(10) Patent No.: US 12,033,077 B2
(45) Date of Patent: *Jul. 9, 2024

(54) LEARNING COMPRESSIBLE FEATURES

(71) Applicant: GOOGLE LLC, Mountain View, CA (US)

(72) Inventors: Abhinav Shrivastava, Mountain View, CA (US); Saurabh Singh, Mountain View, CA (US); Johannes Ballé, San Francisco, CA (US); Sami Ahmad Abu-El-Haija, East Palo Alto, CA (US); Nicholas Milo Johnston, San Jose, CA (US); George Dan Toderici, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/175,125

(22) Filed: Feb. 27, 2023

(65) Prior Publication Data
US 2023/0237332 A1    Jul. 27, 2023

Related U.S. Application Data

(63) Continuation of application No. 16/666,689, filed on Oct. 29, 2019, now Pat. No. 11,610,124, which is a
(Continued)

(51) Int. Cl.
*G06K 9/00* (2022.01)
*G06F 17/15* (2006.01)
(Continued)

(52) U.S. Cl.
CPC ............... *G06N 3/08* (2013.01); *G06F 17/15* (2013.01); *G06F 18/24* (2023.01); *G06N 3/063* (2013.01); *G06N 3/082* (2013.01)

(58) Field of Classification Search
CPC ......................................................... G06N 7/00
See application file for complete search history.

(56) References Cited

U.S. PATENT DOCUMENTS 9,536,177 B2 * 1/2017 Chalasani .............. G06V 10/82
2012/0294541 A1   11/2012 Hsieh et al.
(Continued)

FOREIGN PATENT DOCUMENTS

CN          1906855 A      1/2007
CN        101078931 A     11/2007
(Continued)

OTHER PUBLICATIONS

Alvar et al. "Multi-task learning with compressible features for collaborative intelligence," arXiv1902.05179, Feb. 14, 2019, 5 pages.
(Continued)

*Primary Examiner* — Hadi Akhavannik
(74) *Attorney, Agent, or Firm* — Brake Hughes Bellermann LLP

(57) ABSTRACT

Methods, systems, and apparatus, including computer programs encoded on a computer storage medium, for receiving, by a neural network (NN), a dataset for generating features from the dataset. A first set of features is computed from the dataset using at least a feature layer of the NN. The first set of features i) is characterized by a measure of informativeness; and ii) is computed such that a size of the first set of features is compressible into a second set of features that is smaller in size than the first set of features and that has a same measure of informativeness as the measure of informativeness of the first set of features. The second set of features if generated from the first set of features using a compression method that compresses the first set of features to generate the second set of features.

20 Claims, 8 Drawing Sheets

Related U.S. Application Data continuation of application No. PCT/US2019/025210, filed on Apr. 1, 2019.

(51) Int. Cl.
  *G06F 18/24* (2023.01)
  *G06N 3/063* (2023.01)
  *G06N 3/08* (2023.01)
  *G06N 3/082* (2023.01)

(56) References Cited

U.S. PATENT DOCUMENTS

| | | | |
|---|---|---|---|
| 2016/0275957 | A1 | 9/2016 | Dick et al. |
| 2017/0091657 | A1 | 3/2017 | Kida et al. |
| 2017/0286830 | A1 | 10/2017 | El-Yaniv et al. |
| 2018/0063538 | A1* | 3/2018 | Bernal ............... G06N 5/02 |
| 2018/0211152 | A1* | 7/2018 | Migacz ............... G06N 3/04 |
| 2019/0028783 | A1 | 1/2019 | Clucas |
| 2019/0095806 | A1* | 3/2019 | Martinez Canedo .. G06N 20/00 |
| 2019/0147125 | A1* | 5/2019 | Yu ........................ G06F 30/20 |
| | | | 703/10 |
| 2019/0238893 | A1* | 8/2019 | Covell ................. H04N 19/13 |
| 2020/0126210 | A1* | 4/2020 | Li ........................ G06F 17/15 |
| 2021/0168223 | A1* | 6/2021 | Sarikaya .............. H04L 69/04 |

FOREIGN PATENT DOCUMENTS

| | | |
|---|---|---|
| CN | 102394657 A | 3/2012 |
| CN | 102724511 A | 10/2012 |
| CN | 103746705 A | 4/2014 |
| CN | 104168483 A | 11/2014 |
| CN | 104182997 A | 12/2014 |
| CN | 104202607 A | 12/2014 |
| CN | 106227881 A | 12/2016 |
| CN | 106650924 A | 5/2017 |
| CN | 107122809 A | 9/2017 |
| CN | 107742313 A | 2/2018 |
| CN | 107832837 A | 3/2018 |
| CN | 108510083 A | 9/2018 |
| CN | 108764462 A | 11/2018 |
| CN | 108830829 A | 11/2018 |
| CN | 108846375 A | 11/2018 |
| CN | 109447048 A | 3/2019 |
| EP | 2830051 A2 | 1/2015 |
| JP | 2003153259 A | 5/2003 |
| WO | 2018204708 A1 | 11/2018 |

OTHER PUBLICATIONS

Chen et al. "Intermediate Deep Feature Compression: the Next Battlefield of Intelligent Sensing," arXiv1809.06196, Sep. 17, 2018, 11 pages.
Choi et al. "Deep feature compression for collaborative object detection," arXiv1802.03931, Feb. 12, 2018, 5 pages.
EP Office Action in European Application No. 19734939.2, dated Jul. 1, 2021, 14 pages.
PCT International Preliminary Report on Patentability in International Application No. PCT/US2019/025210, dated Oct. 14, 2021, 12 pages.
PCT International Search Report and Written Opinion issued in International Application PCT/US2019/025210 mailed on Jan. 2, 2020, 19 pages.
First Office Action for Chinese Application No. 201980004446.2 (with English translation), mailed Oct. 13, 2023, 24 pages.
Second Office Action for CN Application No. 201980004446.2 (with English translation), mailed on May 6, 2024, 17 pages.
Chen, "Research on Accelerating Convolutional Neural Networks via Eliminating Weight and Feature Redundancy", China Outstanding Master's Degree Thesis Full Text Database (Information Science and Technology Series), No. 10, Oct. 15, 2018, 66 pages.
Henriques, et al., "Entropy and Compression: Two Measures of Complexity", Journal of Evaluation in Clinical Practice, vol. 19, Issue 6, Jun. 27, 2013, pp. 1101-1106.
Mi, et al., "Large Data Mining Method Based on Semantic Correlation Feature Fusion", Journal of Xinyang Normal University, Natural Science Edition, vol. 32, Issue 1, Jan. 2019, pp. 141-145.
Wang, "Research on Image Recognition Algorithm Based on Sparse Representation and Deep Learning", University of Science and Technology of China, Full Text Database of Chinese Doctoral Dissertations (Information Science and Technology Series), No. 11, May 1, 2018, 111 pages.

* cited by examiner

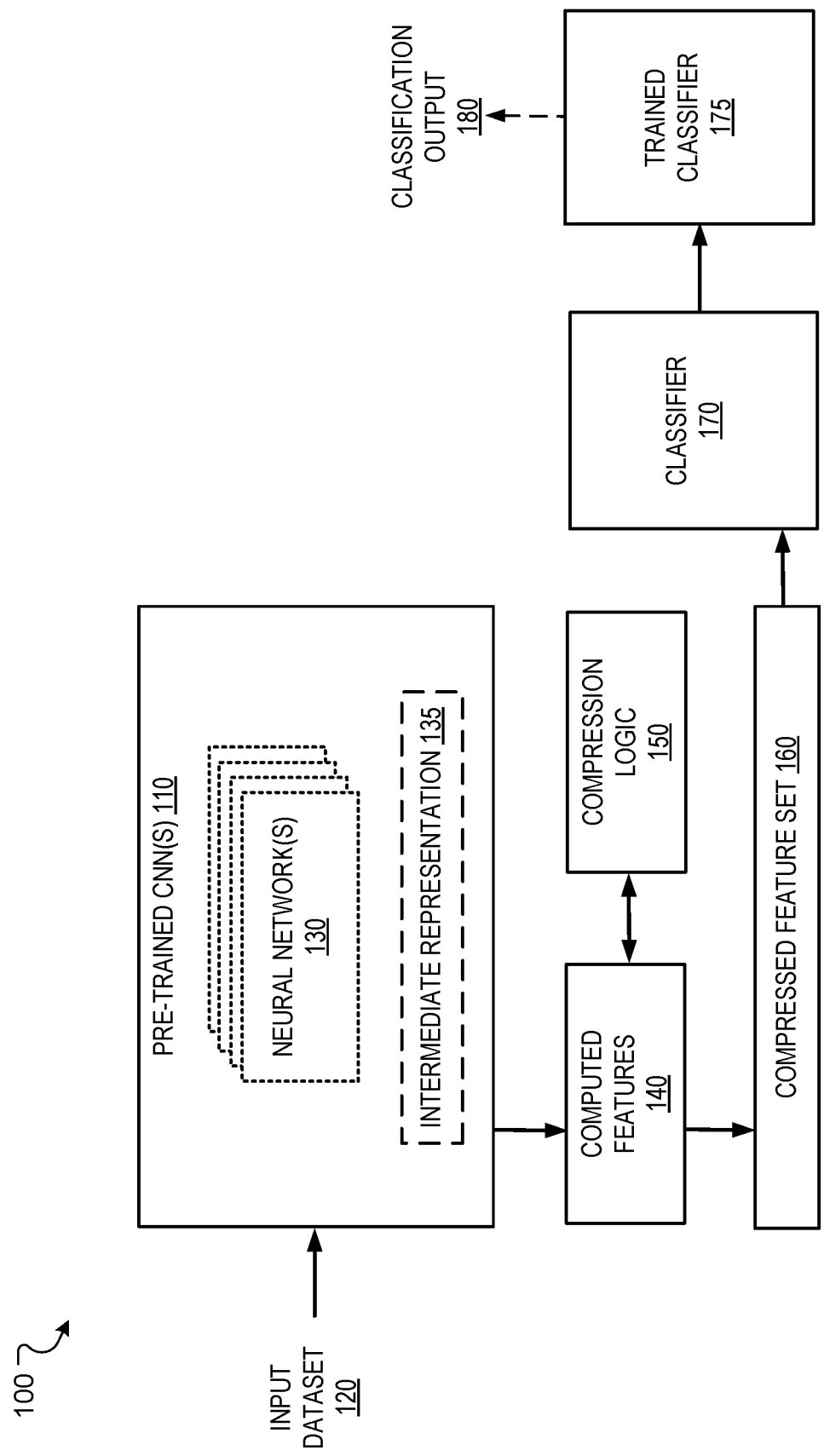

LEARNING COMPRESSIBLE FEATURES

CROSS-REFERENCE TO RELATED APPLICATION

This application is a continuation of U.S. patent application Ser. No. 16/666,689, filed on Oct. 29, 2019, which is a continuation of International Application No. PCT/US2019/025210, filed Apr. 1, 2019, the contents of which are incorporated by reference herein in their entireties.

BACKGROUND

This specification relates to generating sets of features using neural networks.

Neural networks are machine learning models that employ one or more layers of operations to generate an output, e.g., a classification, for a received input. Some neural networks include one or more hidden layers in addition to an output layer. The output of each hidden layer is used as input to the next layer in the network, i.e., the next hidden layer or the output layer of the network. Some or all of the layers of the network generate an output from a received input in accordance with current values of a respective set of parameters.

Some neural networks include one or more convolutional neural network (CNN) layers. Each convolutional neural network layer has an associated set of kernels. Each kernel includes values established by a neural network model created by a user. In some implementations, kernels identify particular image contours, shapes, or colors. Kernels can be represented as a matrix structure of weight inputs. Each convolutional layer can also process a set of activation inputs. The set of activation inputs can also be represented as a matrix structure.

SUMMARY

For machine learning, feature learning is a set of techniques that allows a system to automatically discover representations needed for feature detection or classification from raw data. Feature learning can be an automated process, e.g., replacing manual feature engineering, that allows a machine to both learn a set of features and use the features to perform a specific task. In some examples, the specific task can involve training a classifier, such as a neural network classifier, to detect characteristics of an item or document.

A feature is generally an attribute or property shared by independent units on which analysis or prediction is to be done. For example, the independent units can be groups of image pixels that form parts of items such as images and other documents. The feature can be an attribute of an object depicted in an image, such as a line or edge defined by a group of image pixels. In general, any attribute can be a feature so long as the attribute is useful to performing a desired classification function of a model. Hence, for a given problem, a feature can be a characteristic in a set of data that might help when solving the problem, particularly when solving the problem involves making some prediction about the set of data.

An example artificial neural network ("NN") can be pre-trained to perform one or more data analysis functions. A pre-trained NN can have sets of features or feature vectors that are highly-dimensional and costly to store. Conventional methods for efficiently storing these features can result in distortions that reduce the quality and effectiveness of the data that represents the features. Features can be used by the neural network to perform various functions relating to, for example, image recognition or object recognition. In some implementations, features may need to be pre-computed and stored for certain types of applications where the target task evolves over time.

Pre-trained CNNs can be very powerful as an off-the-shelf feature generator and have been shown to perform very well on a variety of tasks. Unfortunately, the generated features are highly dimensional and expensive to store. For example, storing the generated features may require storing potentially hundreds of thousands of floats per example, particularly when processing electronic data for video files. Traditional entropy based compression methods are of little help and general purpose lossy alternatives are sub-optimal.

This document describes machine learning methods that jointly optimizes for efficient compressibility of an original feature set along with the original target objective used for learning the features. This approach includes identifying the features layer as a bottleneck where the target objective encourages information flow and acts against the goal of compressibility. The described method introduces a penalty that enables a tradeoff between compressibility and informativeness of the features. The plug-in nature of the method makes it straight-forward to integrate with any target objective. The descriptions in this document demonstrate that features learned based on these methods, while maintaining their informativeness for a target task, are orders of magnitude more compressible in comparison to traditional compression methods.

This document also describes an improved method of training a neural network. The described techniques can result in a desirable effect where nodes, e.g., coefficients or weights, of the bottleneck layer of a trained neural network, which represent generalizations of features of the input data that have been learned by the neural network, are amenable to compression using conventional compression algorithms that typically benefit from low entropy of the data to be compressed. For example, to achieve this technical effect, the techniques include augmenting a loss function with an entropy term. The entropy term can correspond to a probability model over coefficients/weights of the bottleneck layer, where the probability model can be implemented by a separate neural network that is trained jointly with at least one other neural network.

One aspect of the subject matter described in this specification can be embodied in a computer-implemented method for computing features for training and testing a machine-learning model, such as a classifier. The method includes receiving, by a neural network, a dataset for generating features derived from the dataset. The neural network comprises multiple layers and at least one layer is a feature layer. The method includes computing, from the dataset, a first set of features using at least the feature layer of the neural network. The first set of features: i) is characterized by a measure of informativeness; and ii) is computed such that a size of the first set of features is compressible into a second set of features that results in a feature set that is smaller in size than the size of the first set of features and that has a same measure of informativeness as the measure of informativeness of the first set of features. The method further includes generating the second set of features from the first set of features using a compression method that compresses the first set of features to generate the second set of features.

These and other implementations can each optionally include one or more of the following features. For example, in some implementations, generating the second set of features comprises: identifying the feature layer as a bottleneck layer of the neural network for reducing dimensionality of features computed using the neural network; generating an intermediate representation using features computed at the bottleneck layer, wherein the intermediate representation is generated based on a loss function; and generating the second set of features in response to applying the compression method to the first set of features that are computed from the intermediate representation.

In some implementations, generating the intermediate representation comprises: applying an entropy term to the loss function to obtain an augmented loss function; and generating the intermediate representation by using the augmented loss function to compute features at the bottleneck layer of the neural network. In some implementations, the loss function includes a quantization element and applying the entropy term to the loss function to obtain the augmented loss function comprises: substituting the quantization element of the loss function with an additive uniform noise element during a training phase of the neural network implemented on a hardware circuit.

In some implementations, the computed features of the intermediate representation have a measure of compressibility that is influenced by the entropy term that is applied to obtain the augmented loss function. In some implementations, computing the first set of features comprises: computing at least a portion of the first set of features using one or more layers of the neural network that precede the feature layer of the neural network.

In some implementations, the bottleneck layer serves to reduce dimensionality of the computed features without degrading a predictive capability of the computed features. In some implementations, the dataset comprises image data and generating the second set of features comprises: training the neural network to learn a hierarchy of features that indicate characteristics of the image data of the dataset, wherein the hierarchy of features ranges from low-level image features comprising lines and edges of items depicted in an image to high-level semantic features that relate to objects of the dataset.

In some implementations, the second set of features is data for training a classifier and the method further comprises: training a neural network classifier to detect characteristics of data objects in the dataset based on characteristics of the features in the second set of features, wherein the neural network classifier is trained by processing the second set of features through one or more layers of the neural network classifier.

In some implementations, the second set of features is a compressed feature set representing a compressed version of the first set of features. In some implementations, the informativeness of the first set of features is defined by at least one of: a measure of precision of computed information in the first set of features; or a dimensionality of the computed information in the first set of features.

In some implementations, the neural network is a pre-trained convolutional neural network that is configured as a feature generator to perform one or more functions related to automated feature engineering. In some implementations, the neural network: is implemented on a hardware circuit; and is a feed-forward feature detector network.

Other implementations of this and other aspects include corresponding systems, apparatus, and computer programs, configured to perform the actions of the methods, encoded on computer storage devices. A computing system of one or more computers or circuits can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The subject matter described in this specification can be implemented in particular embodiments to realize one or more of the following advantages. The described methods allow for computing an initial feature set from an original input dataset. The computed feature set has a particular measure of precision or informativeness that corresponds to the predictive power of the feature set. The described methods include compressing this initial feature set to generate a compressed feature set that has the same, or substantially the same, precision or informativeness as the uncompressed feature set. The computed feature set may be sized such that storing the computed features in the set is prohibitive or requires substantial storage and computing resources. Hence, the described methods can be used to compute a feature set in which a compressed set of features generated from the computed features maintains their inherent precision and informativeness, but requires fewer memory and computing resources for storage and retrieval.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIG. 1 shows an example computing system for generating one or more sets of features.

Like reference numbers and designations in the various drawings indicate like elements.

DETAILED DESCRIPTION

Figure 2A:
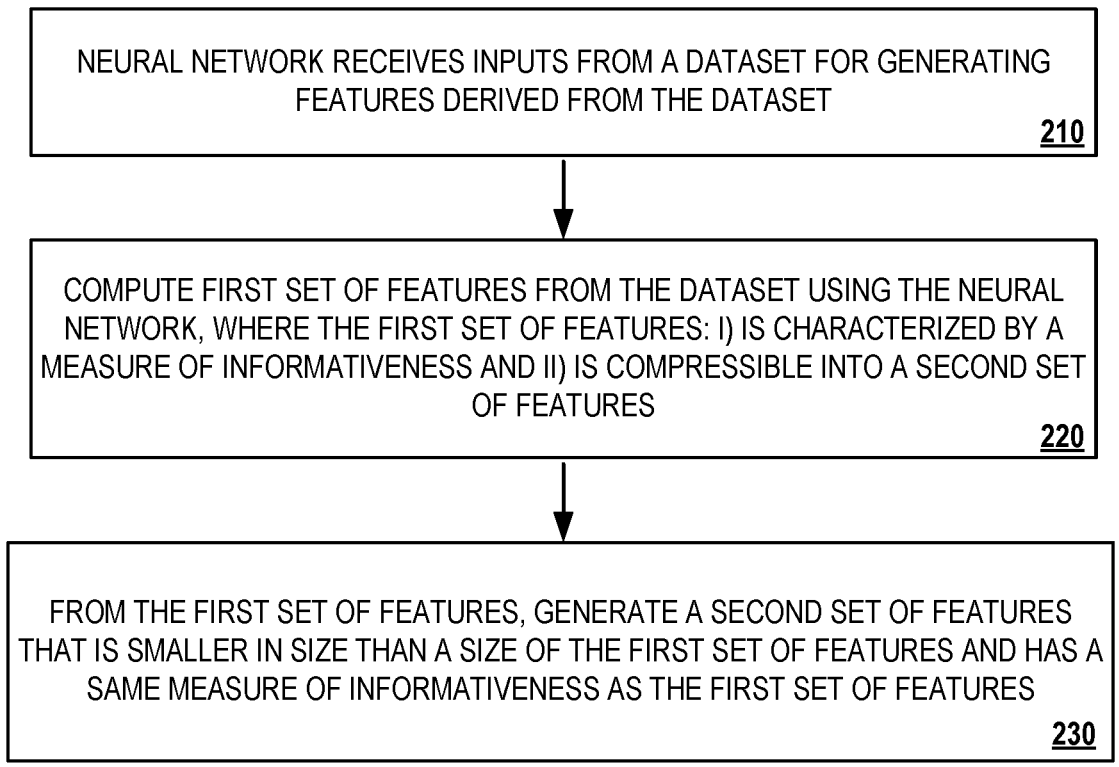
FIG. 2A shows an example process for generating a compressed set of features using the computing system of FIG. 1.

Convolutional neural networks (CNNs) have been successful in computer vision and machine learning and have helped push the frontier on a variety of problems. The success of CNNs is attributed to their ability of learning a hierarchy of features ranging from very low-level images features, such as lines and edges, to high-level semantic concepts, such as objects and parts. As a result, pre-trained CNNs can be configured as effective and efficient feature generators. For example, a pre-trained network as a feature generator, coupled with a simple classifier such as a support vector machine (SVM) or logistic regression, can be configured to outperform hand tuned features on a variety of tasks. This is observed even on tasks that are very different from the original tasks that the CNN was trained on. Because of this, CNNs can be widely used as a feature-computing module in larger computer vision and machine learning application pipelines, such as video and image analysis.

While features tend to be smaller in size in comparison to the original data (e.g., an input dataset) they are computed from, their storage can still be prohibitive for larger input datasets. For example, a YouTube-8M dataset requires approximately two terabytes of memory. If memory reads are slow, training large pipelines of neural networks on such input datasets becomes slow and expensive. The described methods address this issue by computing features in a manner that optimizes the computed features for compressibility as well as for the original training objective. This yields a set of compressed features that are as powerful as the initial set of computed features but that requires only a fraction of the storage cost and memory.

In some implementations, features may be pre-computed and stored for certain types of applications where the target task evolves over time. One example is an indexing system or a content analysis system where a set of categories to be indexed changes over time. Because the categories constantly change, it becomes prohibitively expensive to continuously train the system end-to-end. Another example is a video tagging system where end-to-end training of a classification model may not be feasible due to memory and compute limitations. Such systems are typically implemented as pipelines where features are first computed and stored in a datastore and later a simple and efficient classifier is trained as needed. For similar applications that operate at internet scale, such data stores can grow to a substantially large size, e.g., ranging in the petabytes. The methods for generating compressed features described in this document enables such systems to operate at a fraction of the cost without sacrificing the performance on the target tasks.

Features from CNNs may be derived by removing the top few layers and using the activation of the remaining topmost layer. These features tend to be highly dimensional, requiring a significant amount of memory/storage space when stored using a lossless compression method, especially when computed at a large scale. Lossy compression methods, such as storing at a reduced precision, post-hoc quantization, or dimensionality reduction methods (e.g., principal component analysis (PCA)), are typically employed to reduce the storage cost. For example, a system may contain compressed features for eight million videos where the features are stored at a reduced storage cost based on lossy compression, while the original uncompressed size of the features may have consisted of hundreds of terabytes that require substantially more storage cost. This implies that if one were to store features for even a small fraction of YouTube videos, the uncompressed representations would require hundreds of petabytes. Compressing these features using the aforementioned approaches introduces unwanted distortions in the features, because the objective optimized by the compression method does not take into account the semantic information, resulting in a loss of the discriminative or informative power of the original features.

Accordingly, this document addresses the problem of efficient learning of compressible features by using methods that optimize the precision and informative power of compressed features with reference to the target objective that is used for learning the features. The described approach includes identifying the features layer as a bottleneck, where the target objective encourages information flow and acts against the goal of compressibility. The described method introduces a penalty that enables a tradeoff between compressibility and informativeness of a set of features. The plug-in nature of the described methods makes it straightforward to integrate with any target objective. This document demonstrates that features learned based on these methods, while maintaining their informativeness for a target task, are orders of magnitude more compressible in comparison to traditional compression methods.

FIG. 1 shows an example computing system 100 for generating one or more sets of features. System 100 generally includes an example pre-trained neural network 110 "CNN 110" that processes an input dataset 120 to compute or generate sets of features. The pre-trained CNN 110 can be represented as a single pre-trained neural network 130 or a system of multiple pre-trained neural networks 130 where each pre-trained neural network 130 of the system corresponds to a respective convolutional neural net or CNN. As described in more detail below, the CNN 110 uses the system of pre-trained neural networks 130 to generate an intermediate representation 135 that is used to generate one or more sets of computed features 140.

As described herein, the intermediate representation 135 corresponds to a bottleneck layer of the CNN 110 that can serve to reduce dimensionality of computed features 140 without compromising a predictive power of the computed features. In general, a set of computed features 140 can be characterized by a measure of informativeness that represents predictive power of the computed features. For example, a first set of features that has an example informativeness measure of 0.9 has a higher predictive power than a second set of features that has an example informativeness measure of 0.6. Here, the second set of features has a lower predictive power relative to the predictive power of the first set of features. In some cases, the informativeness of a set of features is defined by at least one of: a measure of precision of computed information in the set of features; or a dimensionality of the computed information in the first set of features.

The sets of computed features 140 can be used to train one or more classifiers to perform certain classification functions, such as classification for recognition of objects in an image. More specifically, based on the methods described herein, system 100 uses CNN 110 to generate a compressed set of features 160 from the computed features 140. For example, the CNN 110 uses a particular compression method specified by compression logic 150 to generate the compressed set of features 160. Compression logic 150 can use one or more compression methods to compress the computed features 140 to generate the compressed feature set 160. In some cases, the compressed set of features 160 may be referred to herein alternatively as compressed feature set 160.

The system 100 uses the compressed feature set 160 to train a classifier 170 to generate a trained classifier 175. In some implementations, the classifier 175 is trained to generate a classification output 180, such as an output indicating an item that was recognized in an image or video. In this manner, the system 100 is configured to employ a set of techniques that includes using CNN 110 as a feature generator that automatically discovers representations needed for feature detection or classification from input dataset 120.

FIG. 2A shows an example process 200 for generating a compressed set of features 160 using the computing system of FIG. 1. The process 200 is described with reference to an example supervised data classification or regression problem. In some implementations, system 100 corresponds to, or includes, one or more neural networks that are implemented on a hardware circuit. The neural network implemented on the hardware circuit can include a pre-trained CNN that is configured as a feature generator to perform one or more functions related to automated feature engineering. As discussed above, the neural networks can include multiple layers and at least one layer of the multiple layers is a feature layer of a neural network(s). In some implementations, the neural network is a feed-forward feature detector network.

System 100 receives input dataset 120 for generating features derived from the dataset (210). For example, system 100 can generate a first set of features by computing at least a portion of the first set of features using one or more layers of the neural network that precede the feature layer of the neural network. In some instances, the generated features can be compressed features 160. Generating the compressed features 160 can include identifying the feature layer as a bottleneck layer of the neural network(s) 130 for reducing dimensionality of features computed using the neural network. The system 100 generates the compressed features 160 using the intermediate representation 135. In some implementations, system 100 generates the intermediate representation 135 using features computed at the bottleneck layer of CNN 110 and based on a loss function.

The system 100 can be configured to minimize a loss function L over a set of parameters θ:

$$\theta^* = \underset{\theta}{\operatorname{argmin}} \sum_{x,y \in \mathcal{D}} L(\hat{y}, y) \text{ with } \hat{y} = f(x; \theta), \quad (1)$$

In equation (1) x is the input variable (e.g., image pixels, or features), y is the target variable (e.g., classification labels, or regression target), $\hat{y}$ is the prediction, f can be an artificial neural network (ANN) with θ comprising its set of filter weights, and D is a set of training data.

The system 100 computes a first set of features (e.g., computed features 140) from the input dataset 120 using at least a feature layer included in neural networks 130 of the CNN 110. The first set of features: i) is characterized by a measure of informativeness; and ii) is computed such that a size of the first set of features is compressible into a second set of features that results in a feature set that is smaller in size than the size of the first set of features and that has a same measure of informativeness as the measure of informativeness of the first set of features (220).

In general, computing features corresponds to learning a set of representative features that can be used in place of a larger set of information contained in the input dataset 120. To learn a set of representative features that can be used in place of x, the system 100 is configured to introduce an intermediate representation 135 indicated by variable z. In some implementations, the intermediate representation 135 is generated by splitting f into two parts, $f_1$ and $f_2$. The prediction $\hat{y}$ is then given by:

$$\hat{y}=f(x;\theta)=f_2(z;\theta_2) \text{ with } z=f_1(x;\theta_1) \quad (2)$$

As indicated above, it is common to speak of an intermediate representation like z as a bottleneck. In many cases, for example in the context of autoencoders, a bottleneck serves to reduce dimensionality without compromising predictive power, i.e., z is forced to have a smaller number of dimensions than x. Similarly, the bottleneck layer of CNN 110 can be used to reduce the dimensionality of computed features 140 without degrading a predictive capability of the compressed feature set 160 generated from the computed features 140. Because the number of dimensions is a hyperparameter (e.g., an architectural choice), no changes to the loss function L are necessary, and an example neural network model is simply trained to minimize the loss under a given constraint. However, dimensionality reduction is only a crude approximation to data compression.

The system 100 generates the second set of features (e.g., feature set 160) from the first set of features using a compression method that compresses the first set of features to generate the second set of features (230). Hence, the second set of features is a compressed feature set 160 representing a compressed version of the first set of features. In some implementations, input dataset 120 includes image data and generating the second set of features includes training the neural network 130 of CNN 110 to learn a hierarchy of features that indicate characteristics of the image data of the dataset. The hierarchy of features can range from low-level image features that includes lines and edges of items depicted in an image to high-level semantic features that relate to objects of the dataset.

The system 100 generates the second set of features in response to applying a compression method, of compression logic 150, to the first set of features that are computed from the intermediate representation 135. In general, data compression works by mapping each possible data point to a variable length of symbols (typically bits), storing or transmitting them, and inverting the mapping at the receiver side.

More specifically, the optimal number of bits needed to store a discrete-valued data set Z is given by the Shannon entropy:

$$H = -\sum_{\hat{z} \in Z} \log_2 p(\hat{z}), \quad (3)$$

where p is the probability distribution of the data points, which needs to be available to both the sender of the data and the receiver of the data. The probability distribution is used by entropy coding techniques, such as arithmetic coding or Huffman coding, to implement the mapping.

In some implementations, generating the intermediate representation 135 includes applying an entropy term to the loss function L to obtain an augmented loss function. The intermediate representation 135 can be generated by using the augmented loss function to compute features at the bottleneck layer of the neural network. In some cases, the features computed using the intermediate representation 135 have a measure of compressibility that is influenced by the entropy term applied to obtain the augmented loss function. For example, the compressibility of the bottleneck representation may be traded off against a prediction or regression error, until the error is determined to be sufficient for a particular application, enabling greater storage savings. This is generally referred to as lossy compression. To enable targeting different trade-offs, system 100 is configured to augment the loss function with an entropy term:

$$\theta^*, \phi^* = \underset{\theta,\phi}{\operatorname{argmin}} \sum_{x,y \in \mathcal{D}} L(\hat{y}, y) + \lambda \cdot \underbrace{-\log_2 p(\hat{z}; \phi)}_{\text{bit rate } R}, \quad (4)$$

where $\hat{z}=\lfloor f_1(x; \theta_1)\rceil$, $\hat{y}=f_2(\hat{z}; \theta_2)$ and p is a probability model over $\hat{z}$ with parameters φ, which are trained jointly with θ. $\lfloor \cdot \rceil$ here indicates that the output of $f_1$ is rounded to the nearest integers and is associated with a quantization element of the loss function. This quantization is useful, as compression takes place in a discrete space with a countable number of possible states. This is a way in which a trade-off between compression performance and prediction performance is achieved. For example, when the number of possible states in $\hat{z}$ is reduced (e.g., by scaling down the outputs of $f_1$), the bit rate R can be reduced at the expense of prediction performance, since the quantization then introduces a greater relative error in $\hat{z}$. Conversely, the prediction performance can be improved by increasing the number of possible states, at the expense of compressibility. The hyperparameter corresponds to a weight variable λ for controlling the weight of the rate term, and hence the desired trade-off. This type of bottleneck can be referred to as an entropy or information bottleneck.

In some implementations, the loss function can include a quantization element and applying the entropy term to the loss function to obtain the augmented loss function can include substituting the quantization element of the loss function with an additive uniform noise element during an example training phase of a neural network, such as a second neural network that is used to obtain the probability model. For example, it may not be feasible to minimize the above described loss function directly with descent methods, as the quantization can lead to gradients that are zero almost everywhere. Instead, system 100 can substitute the quantization with additive uniform noise during training.

The addition of uniform noise during training allows the system to simulate errors that may result from quantization, without actually doing or performing quantization (e.g., such as quantization for which the gradients are zero and thus can't be used in training). In some cases, this substitution can be done for modeling the rate. Techniques relating to this additive noise approach are described in more detail below. For distortion, the system can discretize, e.g., by rounding, and substitute the gradients by identity (straight-through).

Further, as an alternative to using a piecewise linear density model, a more refined density model may be used instead. For example, a piecewise linear density model on its own may be limited and, thus, may not work well for modeling density. A more refined density model may be used instead to obtain better results relating to density modeling.

In some implementations, the weight λ for the entropy penalty of equation 4 can affect the magnitude of gradient updates for the parameters φ of the probability model p. A smaller value of λ can reduce the effective learning rate of φ causing the model to learn slower. This may result in disconnects between the observed distribution and the model. An Adam optimizer can be used to compute updates that are normalized by a square root of a running average of squared gradients. This has the desirable property that a constant scaling of loss does not affect the magnitude of updates. Therefore, for the combined loss in equation 4, the λ only affects the relative weight of the gradient due to the entropy penalty, without changing the effective learning rate of φ.

The probability mass function of a quantized/rounded variable is given by integrating the probability density over all values that are mapped to the same integer:

$$p(\hat{z}) = \int_{\hat{z}-\frac{1}{2}}^{\hat{z}+\frac{1}{2}} p(z)dz = c\left(\hat{z}+\frac{1}{2}\right) - c\left(\hat{z}-\frac{1}{2}\right), \quad (5)$$

where $\hat{z}$ is any integer value, and c is the cumulative of p. Similarly, the probability density of a variable subjected to additive standard uniform noise is given by:

$$p(\tilde{z}) = \int_{\tilde{z}-\frac{1}{2}}^{\tilde{z}+\frac{1}{2}} p(z)dz = c\left(\tilde{z}+\frac{1}{2}\right) - c\left(\tilde{z}-\frac{1}{2}\right), \quad (6)$$

where $\tilde{z}$ is any continuous value. Note that both expressions for equations (5) and (6) are identical: the density of the noisy variable interpolates the probability mass function of the quantized variable at non-integer values. This fact is used to create a differentiable proxy loss for training.

In the spirit of normalizing flows, the density model used is directly defined as the above difference of the cumulatives. To create a valid density model, c can be any function c: $\mathbb{R} \to [0, 1]$ which satisfies the following properties:

$$c(-\infty) = 0; \quad c(\infty) = 1; \quad \frac{\partial c(x)}{\partial x} \geq 0. \quad (7)$$

This can be achieved by implementing the density model using a neural network (NN), where the last activation function is a logistic function, ensuring the first two requirements are satisfied. The third monotonicity requirement of expression (7) is guaranteed by allowing only monotonic activation functions and ensuring all linear weights in the network are positive.

For one or more examples described in this document, an entropy model can include a neural network with zero or more hidden layers. In some examples, the entropy model can include a neural network with at least one hidden layer, each with at least one hidden unit. The number of layers can correspond to overall performance of the density model. For example, increasing the quantity of layers included in the entropy model will translate to a more powerful density model that yields better performance results. A separate model can be used for each vector element $\hat{z}_i$ in $\hat{z}$, yielding a fully factorized probability model:

$$p(\hat{z}) = \prod_i p(\hat{z}_i). \quad (8)$$

In case of bottlenecks with a spatial configuration, system 100 is configured such that spatial elements within a same channel have the same distribution (e.g., parameters of the density model were shared across space). As described above, the system 100 uses the compressed feature set 160 to train a classifier 170 to generate a trained classifier 175. Hence, the compressed feature set 160 is data for training an example neural network classifier 170 to detect characteristics of data objects in the input dataset 120, based on characteristics of the features in the compressed feature set 160. In some implementations, the neural network classifier 170 is trained by processing the compressed feature set 160 through one or more layers of the neural network classifier to generate the trained classifier 175.

As indicated below, the improved methods described in this document may be evaluated against one or more example classification models that represent common off-the-shelf feature generation methods. Datasets from some example evaluations demonstrate the improved methods described above can yield computed features 140 that are significantly more compressible than features obtained using common, off-the-shelf methods and without loss of expressiveness or informativeness relating to predictive power that results from the common methods. In some implementations, the example evaluations involve the standard practice of considering the activations of the penultimate layer immediately after the non-linearity as the feature layer. For example, system 100 can be configured to treat this feature layer as the bottleneck 2 and apply the rate penalty over it.

Figure 2B:
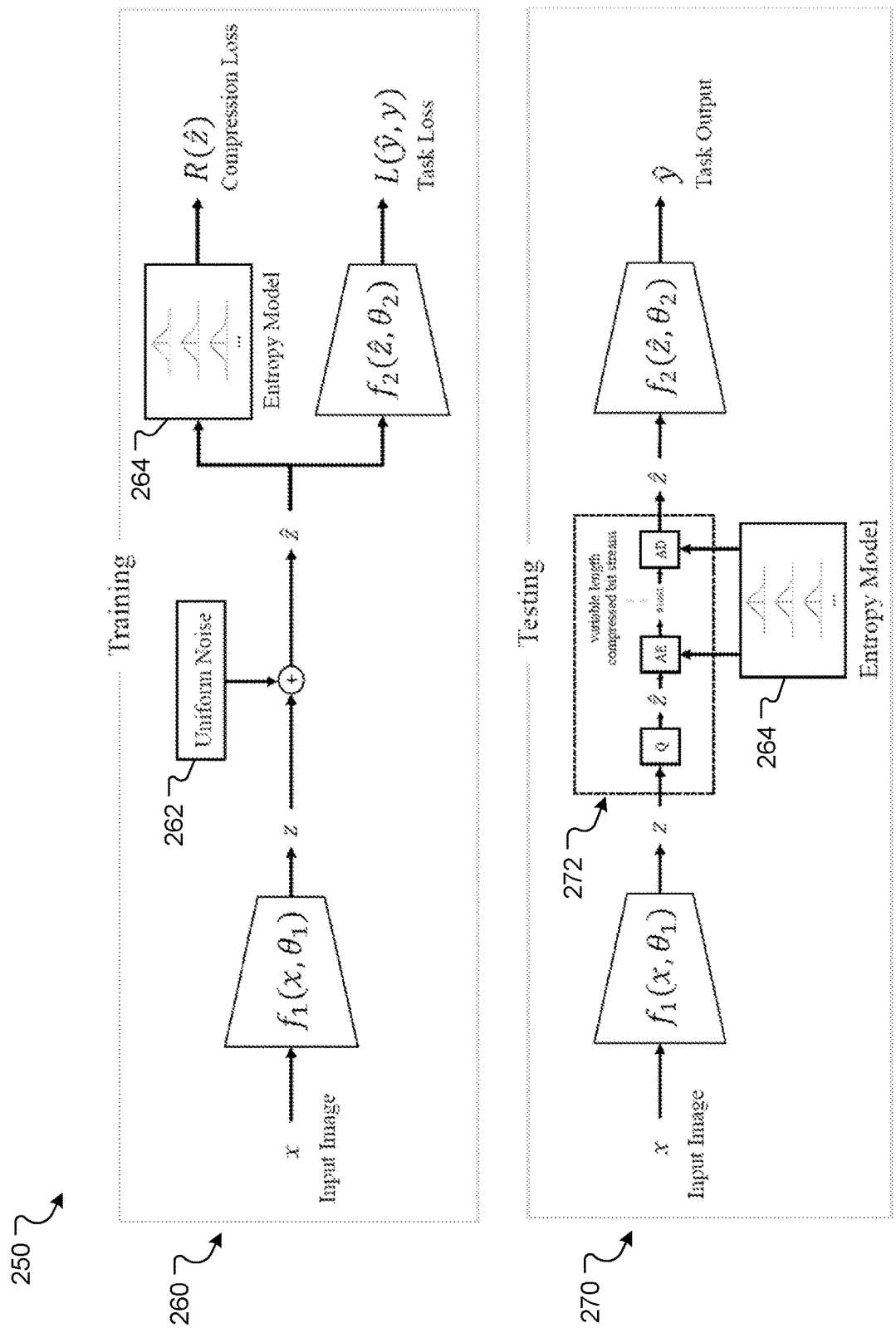
FIG. 2B shows an example block diagram associated with machine-learning methods for generating and evaluating a compressed feature set.

FIG. 2B shows an example block diagram 250 associated with machine-learning methods for training a neural network to generate a compressed feature set (260) and for evaluating or testing a compressed feature set (270).

In the implementation of FIG. 2B, $f_1$ produces an intermediate representation z from the input images x, where the input images can correspond to images included in the input dataset 120 described above. During training, uniform noise 262 is added to simulate quantization while allowing for gradient based optimization. An entropy model 264 is used to model the distribution of $\hat{z}$ and impose compression loss, $R(\hat{z})$. However, during testing, intermediate representations z are quantized using rounding (Q) to yield $\hat{z}$ and arithmetic encoding (AE) is then used to produce a variable length bit string for storage (272). This variable length bit string can be decoded using arithmetic decoding (AD) to yield $\hat{z}$ and to determine final predictions corresponding to a task output. Other details associated with the implementation of FIG. 2B are described herein and may be referenced at least above at the descriptions of FIG. 1 and FIG. 2A.

Figure 3A:
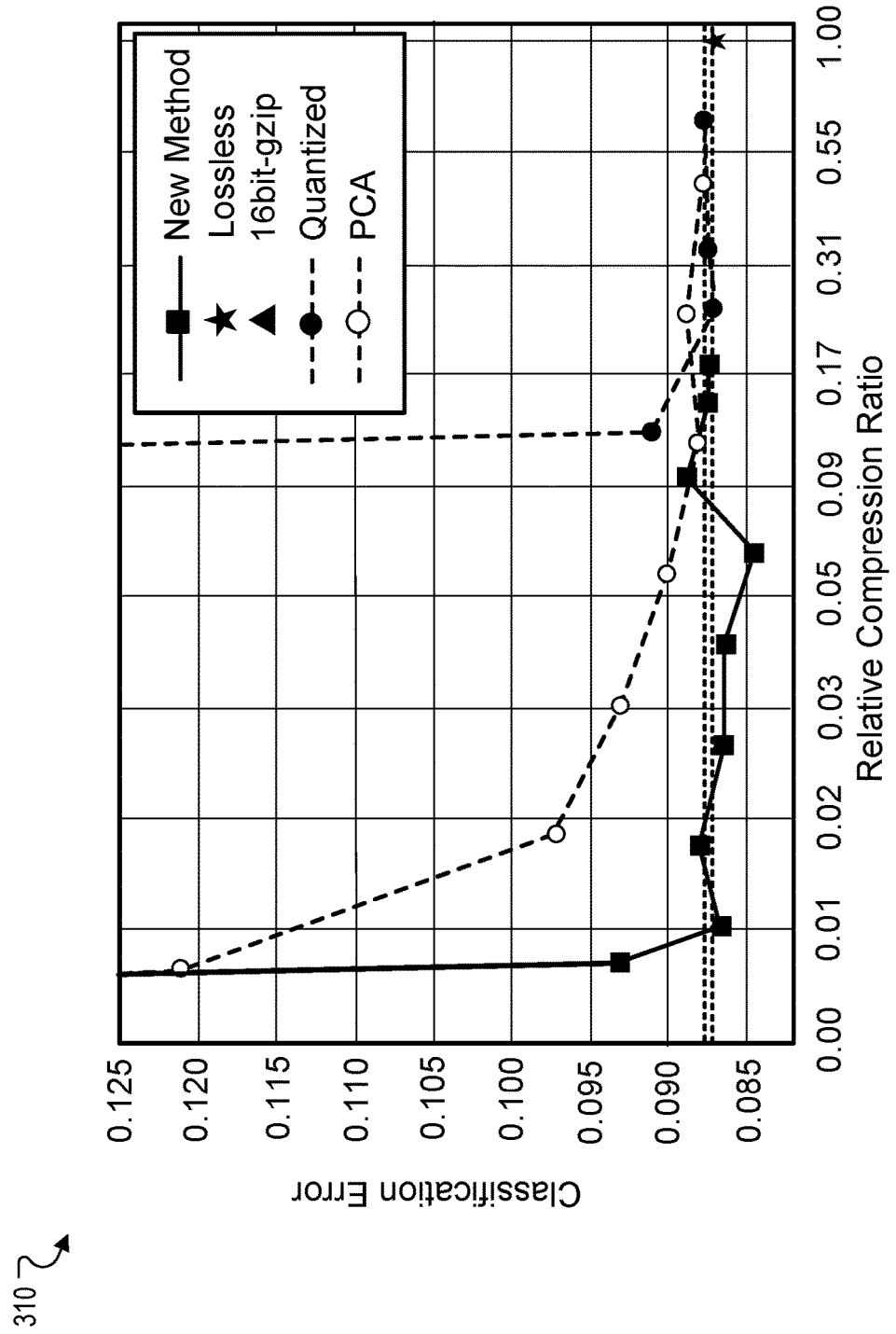
FIG. 3A and FIG. 3B each show graphical data about classification error associated with a compressed set of features generated from respective labeled datasets.
Figure 3B:
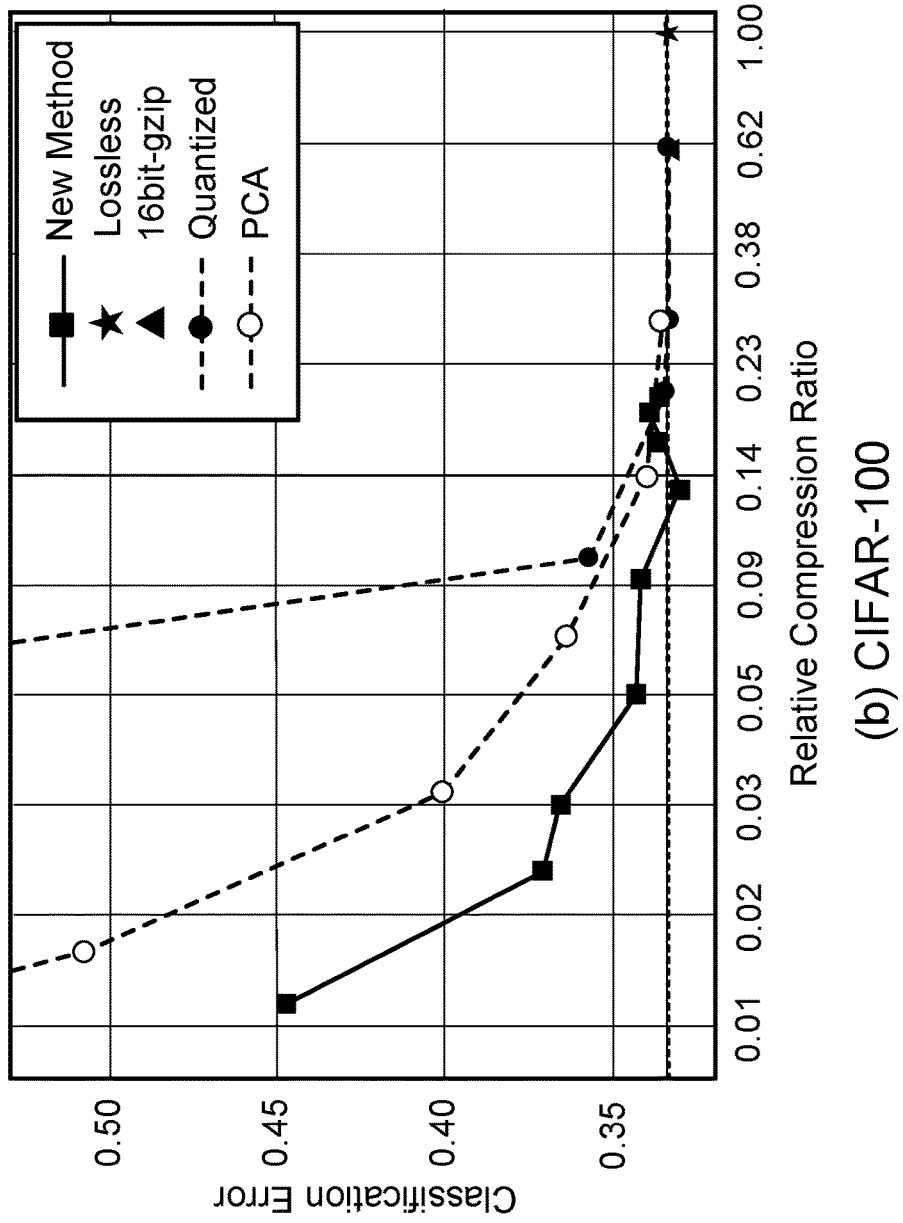

FIGS. 3A and 3B each show graphical data about classification error associated with a compressed set of features generated from respective labeled input datasets. FIG. 3A shows graphical data 310 that indicates observed classification error against relative compression ratio for a CIFAR-10 image dataset. Similarly, FIG. 3B shows graphical data 320 that indicates observed classification error against relative compression ratio for a CIFAR-100 image dataset. CIFAR-10 (FIG. 3A) and CIFAR-100 (FIG. 3B) are each image classification datasets that contain 10 and 100 image classes, respectively. In some implementations, CIFAR-10 and CIFAR-100 each contain 50,000 training and 10,000 testing images.

As indicated by FIGS. 3A and 3B, the improved methods of this document (e.g., as described above) can produce informative yet highly compressible feature representations. The graphical data 310, 320 visualizes the classification error of decompressed features as a function of the relative compression ratio with respect to the lossless compression on CIFAR-10 (FIG. 3A) and CIFAR-100 (FIG. 3A). In some implementations, these decompressed features correspond to a decompressed version of the compressed feature set 160 generated using CNN 110 of system 100.

For CIFAR-10, the improved method can produce representations that are 1% of the size of when losslessly compressed, while having the same accuracy. Similarly, for CIFAR-100, the representations produced by the improved method preserve the accuracy at 10% of the losslessly compressed size, while exhibiting similar classification error.

As indicated by FIGS. 3A and 3B, result datasets of the evaluations can be presented in the form of an example graph showing Classification Error vs. Relative Compression. The relative compression is measured as a fraction of the compressed size achieved by lossless compression baseline described below.

Considering baseline compression methods, the improved method may be evaluated by comparing it against several standard methods as discussed below and using a sample set of input data that can include multiple different images and image classes. For these methods, the feature representation for each image in an input dataset is computed in float 32 precision and compressed independently. The performance of these methods can be reported as the classification error achieved at a particular compression rate, which is reported as a fraction of the losslessly compressed size (e.g., a relative compression ratio).

In some implementations, for lossless compression, the representations are compressed using the gzip compatible zlib compression library in Python. For example, each representation is first converted to a byte array and then compressed using zlib at the highest compression level of 9. For 16-bit-gzip, the representations are first cast to a 16-bit floating point representation and then losslessly compressed. For quantized, the representations are scaled to a unit range followed by quantization to equal length intervals. Performance can be represented as a function of the number of quantization bins in the set $\{2^{16}, 2^8, 2^4, 2^2\}$. These quantized values are again losslessly compressed using gzip to obtain additional compression gains. If fewer than 256 quantization bins are used, then the data is natively stored as a byte (not packed) before gzip is used.

For a dimensionality reduction method such as principal component analysis (PCA), a full covariance matrix is estimated on the representations computed over the training set and its eigen-decomposition is computed to yield the principal components. The performance is represented as a function of the number of components used in the set $\{1, 2, 4, 8, 16, 32, 64\}$. The PCA basis can be considered as part of the compression model and excluded from computation of compression cost. In some implementations, the coefficients are stored at 32-bit float precision and the raw number of bits can be reported as the size, because compression using zlib may consistently increase the file size.

In some implementations, the base classification model is a 20 layer ResnetV2 model for both CIFAR datasets. The neural networks can be trained using SGD for 128,000 iterations and using a cosine decay learning rate schedule with an initial learning rate of 0.005. A standard data augmentation of left-right flips and zero padding all sides by 4 pixels followed by a 32×32 crop can be used. In some cases, a weight decay of 0.0001 can be used when the model is trained on a single Graphics Processor Unit (GPU) using a batch size of 128.

Regarding the compressibility of learned feature representations, FIGS. 3A and 3B each indicate that the improved method consistently produces representations that are an order of magnitude more compressible than when losslessly compressed, while maintaining or largely maintaining the discriminative and predictive power of the uncompressed learned representations. In some implementations, the classification error of the decompressed features is visualized as a function of the relative compression ratio with respect to the lossless compression.

As noted above, for CIFAR-10, the improved method can produce representations that are 1% of the size of the lossless compression, while matching the accuracy. This is likely due to the fact that there are only 10 classes which would ideally only require log 2 10 bits. For CIFAR-100, the improved method can produce representations that are compressed to 10% of the size of lossless compression, while retaining the same accuracy. For CIFAR-100 there is an order of magnitude reduction in achieved compression relative to CIFAR-10 with an order of magnitude increase in the number of categories (e.g., from 10 to 100).

For both the CIFAR-10 and CIFAR-100 datasets, 16 bit-gzip consistently retains performance, indicating that 16 bit precision is sufficiently accurate for these representations. Quantization may lose performance as the number of quantization bins is decreased. In some implementations, PCA performs better than other baselines, however its performance may degrade as fewer components are used.

In some implementations, the described methods may have a regularizing effect. In addition to pure lossy compression, in some cases the proposed methods acts as an activation regularizer, allowing classification results on the validation set which are higher than when using the original network, while exhibiting higher training error (e.g., see Table 1 below). This regularization effect can be described as having a sweet spot which may provide some insight into the complexity of a problem to be solved. Unlike normal regularization methods, the described approach makes a tradeoff between the information passed between the encoder network and the classifier. Therefore, the amount of information required for a particular classification task can be explicitly measured. In some implementations, CIFAR-100 requires less compression to achieve the best result, whereas CIFAR-10 requires about half as much information in order to obtain the best result. This indicates that a network designed to solve both problems may be a bit larger than needed in the case of CIFAR-10.

Figure 4:
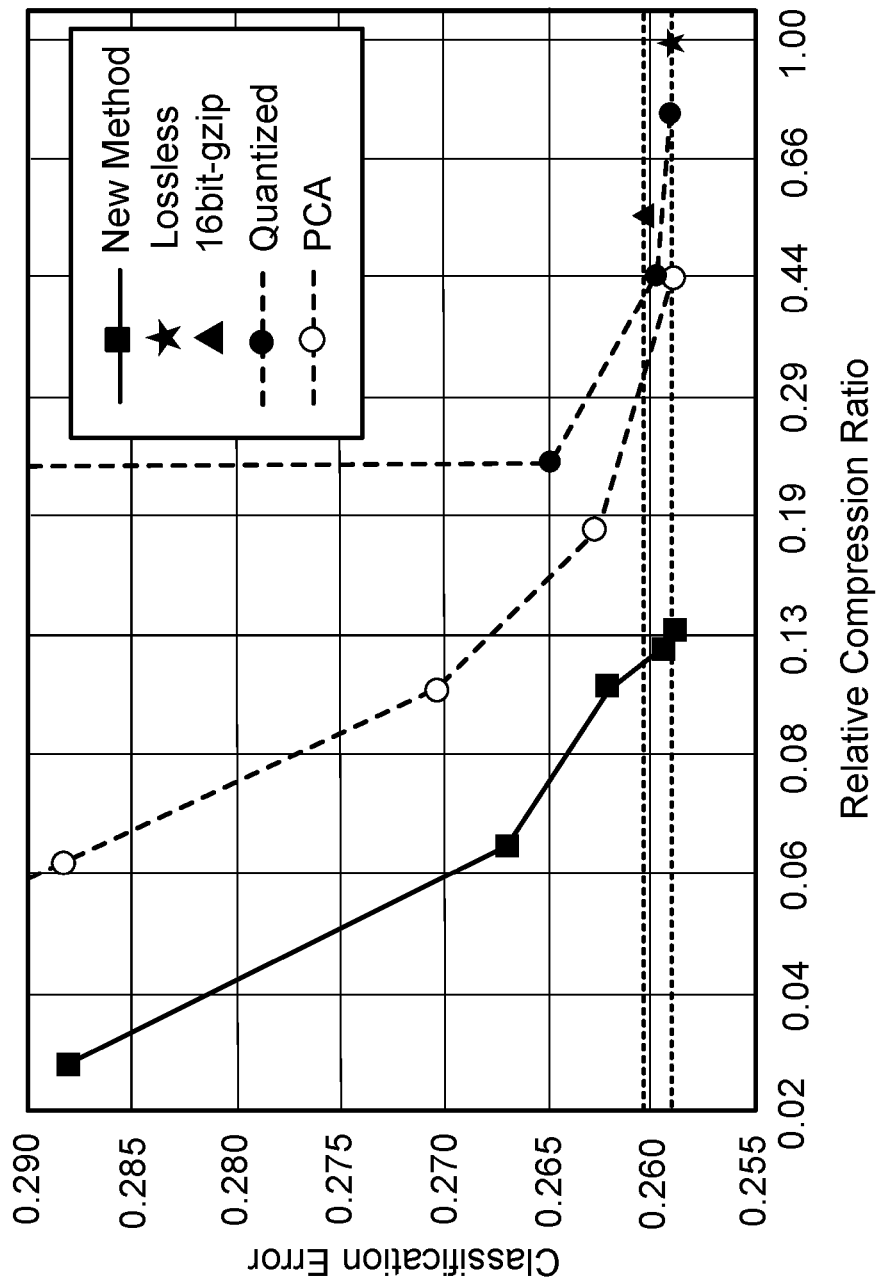
FIG. 4 shows example graphical data about classification error associated with a compressed set of features generated from a particular type of labeled dataset.

FIG. 4 shows example graphical data 410 indicating classification error associated with a compressed set of features generated from a particular type of labeled dataset. For example, the improved method(s) can be evaluated using an ImageNet classification dataset that has 1000 image classes. On ImageNet, the improved method preserves the accuracy of an initial feature set while reducing the storage cost to approximately 12% of the losslessly compressed file size.

This example evaluation can include training a model on approximately 1.2 million training images and reporting results on a set of 50,000 validation images. In some implementations, a 50 layer ResnetV2 model can be used as a base model for the evaluation. The neural networks can be trained using SGD for 300,000 iterations and using a cosine decay learning rate schedule with an initial learning rate of 0.001. A standard data augmentation can be used when training on image crops of 299×299 pixels. In some implementations, a weight decay of 0.0001 can be used when training each model on 8 GPUs with a batch size of 32 per GPU, resulting in a combined batch size of 256 and synchronous updates. In some cases, the evaluation includes reporting a top-1 classification error that is computed on a 299×299 pixel center crop.

Regarding the compressibility of learned feature representations, the graphical data of FIG. 4 indicates a trend similar to that observed on the CIFAR-10/100 datasets described above with reference to FIGS. 3A and 3B. The improved method produces highly compressible representations in comparison to other baseline methods and is able to preserve the accuracy while reducing the storage cost to 12% of the losslessly compressed file size. In some implementations, lossless storage at 16-bit precision can result in a 0.14% increase in error. Similar to the CIFAR-10/100 datasets, a regularization effect can occur, as depicted in Table 1 below, with a higher error on the training set versus the baseline, despite better validation performance.

Figure 5A:
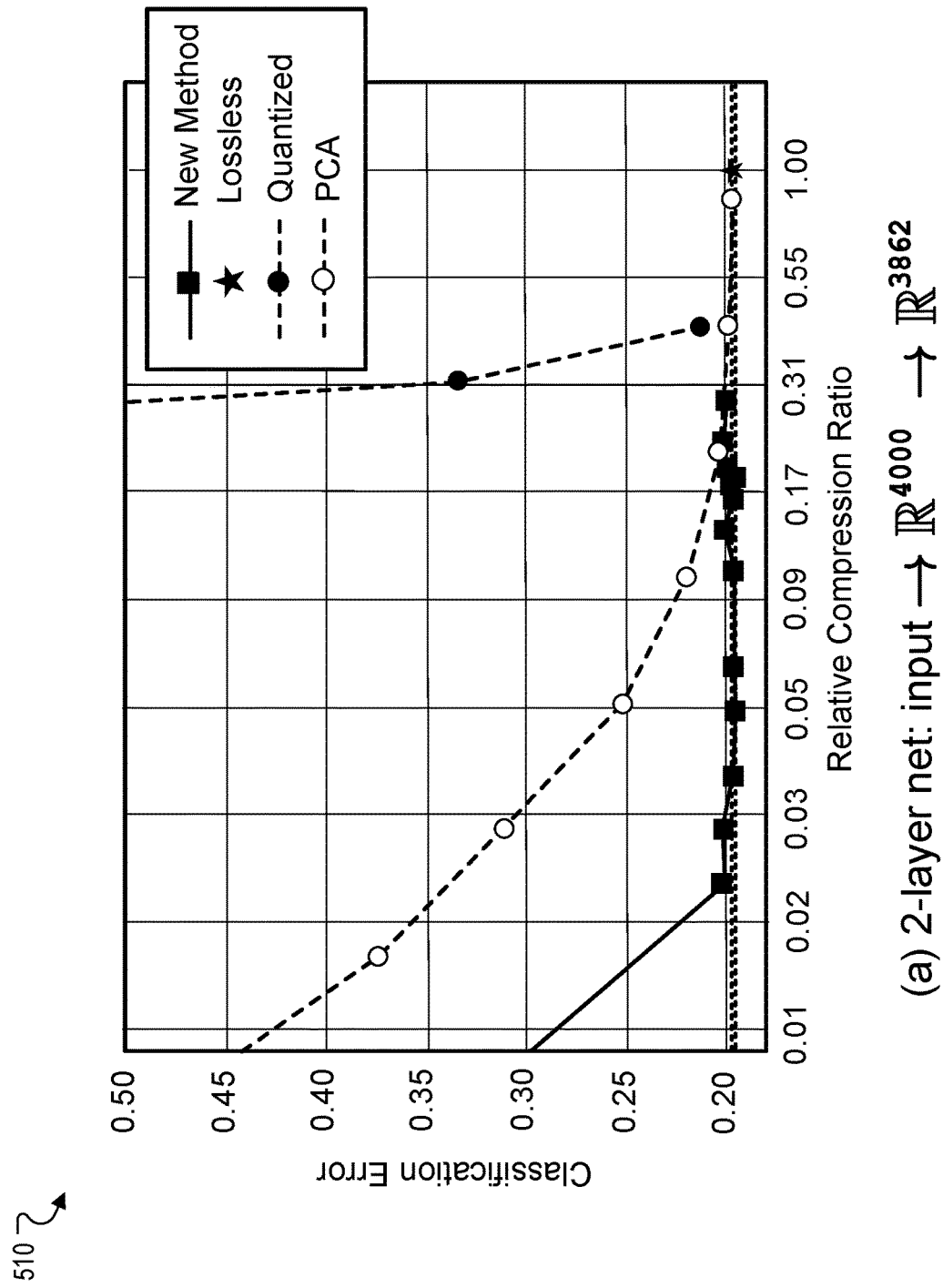
FIG. 5A shows graphical data about classification error associated with a compressed set of features generated using a two-layer neural network.
Figure 5B:
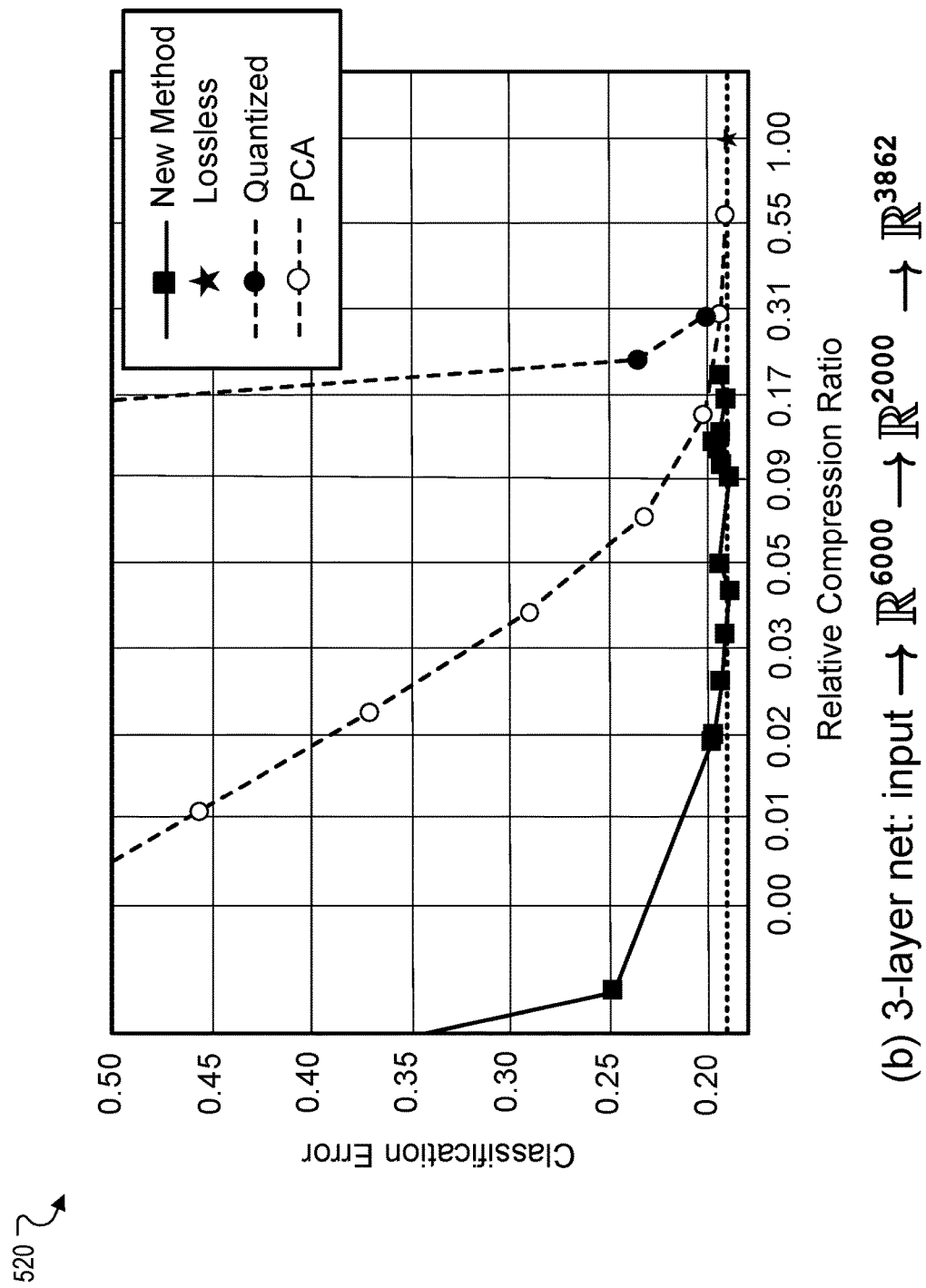
FIG. 5B shows graphical data about classification error associated with a compressed set of features generated using a three-layer neural network.

FIG. 5A shows graphical data 510 indicating classification error associated with a compressed set of features generated using a two-layer neural network. FIG. 5B shows graphical data 520 indicating classification error associated with a compressed set of features generated using a three-layer neural network. The graphical data 510, 520 for each of FIGS. 5A and 5B is based on example evaluation of the improved methods using a Youtube-8M ("YT-8M") dataset. The YT-8M dataset is a large publicly available video classification dataset that includes over six million videos and 3862 image classes. On the YT-8M dataset, the improved method preserves the accuracy of a compressed version of an initial set of computed features while reducing the storage cost to between 5% and 10% of the losslessly compressed file size. Evaluation and comparison of the described methods versus other conventional approaches can be performed using a 2-layer network (FIG. 5A) and a 3-layer network (FIG. 5B).

In some implementations, the example evaluation includes first aggregating a set of video sequence features into a fixed-size vector using mean pooling. A base model that is a neural network composed of two or three fully-connected layers may be used. The neural network can include ReLU activation and batch normalization ("BatchNorm") on its hidden layers, and logistic activation without BatchNorm on the output layer. A weight decay of 10-6 can be used and each model can be trained on one CPU, with a batch size of 100, minimizing cross-entropy loss, and using TensorFlow's Adam Optimizer for 300,000 steps. An initial learning rate can be swept from choices {0.04, 0.02, 0.002, 0.001, 0.0005} and the learning rate can be multiplied by 0.94 every 1000 steps. For each model architecture, a preferred learning rate is used according to a held-out validation set. The compression can be applied on the last hidden activations, just before the output layer.

Regarding the compressibility of learned feature representations, the improved methods can be used to substantially lower the storage requirements for storing compressed features for semantic video information, while also preserving (or slightly improving) the generalization accuracy. The accuracy metrics are measured on the "validation" partition of the YT-8M dataset. This can potentially have a large impact on online video systems. By extrapolation, assume a hypothetical online video system with one billion videos that seeks to annotate the videos using the audio-visual content to support a Video Search endpoint. Storing a mean-pooled audio-visual features (e.g., identical to ones available in YT-8M) would require a storage of 4.6 Terabytes in the raw storage form. However, if the annotation system is trained using the improved methods described in this document, then the storage requirements would drop to less than 150 Gigabytes, while potentially improving the generalization performance for annotating new videos.

|  | Training Error | | Validation Error | | Validation Set Size | | |
| --- | --- | --- | --- | --- | --- | --- | --- |
|  | Lossless | Method | Lossless | Method | Lossless | Method | Raw |
| ImageNet | 17.04 | 17.35 | 25.91 | 25.89 | 6.95 GB | 0.85 GB | 38.15 GB |
| CIFAR-10 | 0.14 | 0.29 | 8.73 | 8.45 | 41.53 MB | 2.78 MB | 156.25 MB |
| CIFAR-100 | 0.25 | 1.54 | 33.39 | 33.03 | 69.14 MB | 9.28 MB | 156.25 MB |
| YouTube-8M | 19.56 | 19.75 | 19.76 | 19.49 | 5.30 GB | 0.27 GB | 17.80 GB |

As shown via Table 1 above, the improved methods can significantly reduce the storage cost in addition to having a regularization effect. The total compressed size of the evaluation datasets along with final training and validation errors of a trained model can be compared against a baseline model trained without a rate penalty. For each dataset, the lowest rate model with error lower than baseline is selected. For the YT-8M dataset, the reported size is of video level features. The gap between training and validation errors is consistently smaller for models trained using the improved methods of this document. This indicates that the entropy penalty has a regularization effect, while models trained using the improved methods significantly reduces the total size of the compressed feature set.

Regarding joint optimization for compression, common or conventional approaches propose to extend an auto-encoding compression network by adding an additional inference branch over the bottleneck for auxiliary tasks. However, the improved method of this document does not use any auto-encoding penalty, but rather directly optimizes for the entropy along with the task specific objective. As a result, the described methods do not require that the domain is amenable to auto-encoding. Further, the improved method can be plugged-in to any architecture as an additional penalty without architectural changes or structural constraints.

Various dimensionality reduction methods are within the scope of this disclosure. While not trying information-theoretic compression, there are various lossy dimensionality reduction methods that can be applied to minimizing the space needed for pre-computed CNN features. For example, PCA, Linear Discriminant Analysis (LDA), or Independent Component Analysis (ICA) may be used. In some implementations, product quantization may be also used. However, in contrast to the improved methods described in this document, none of these methods take into account the true loss that needs to be minimized. In some cases, these methods can rely on surrogate losses (typically $L_2$). In the context of neural networks, it is also possible to use auto-encoders for reduction. The autoencoders can achieve compression by varying the number of dimensions needed for the hidden representation, and is a typical scenario for image compression.

With reference to variational information bottleneck, the described approach is a particular instantiation of a more general information bottleneck framework. In some cases, mutual information can correspond to a parameterization independent measure of informativeness, a task dependent measure can typically be used and may be better suited if target tasks are known ahead of time. Most classification models are typically trained to optimize cross entropy and the same process may be used in this document as a measure of informativeness.

As indicated above, some approaches to generating compressed feature sets may include using compressed representations from off-the-shelf compression algorithms. For example, compressed representations can be directly used for training machine-learning algorithms. This approach can be appealing because the low memory and computational requirements of the compressed representation enable efficient real-time processing, while also avoiding decoding overhead. The improved methods described herein can differ from these existing approaches in that the described methods jointly optimize for a compressible representation along with the target task. In contrast, the existing approaches use off-the-shelf compression methods that are optimized for a reconstruction objective and cannot adapt for a target task. In some instances, a linear SVM configured for pixel classification is used on compressive hyperspectral data. In other implementations, hyperspectral pixel classification can be performed on the compressive domain using an adaptive probabilistic approach. Also, some approaches involve feeding discrete cosine transform ("DCT") compressed image data into the network to speed up machine learning algorithms applied on the images.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer.

Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment.

Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   computing, from a dataset, a first set of features that have a first dimension; and
   generating a second set of features from the first set of features using a neural network having a set of neural network parameters and a compression method that compresses the first set of features by entropy coding the first set of features using a probability distribution jointly learned with the set of neural network parameters,
   wherein the second set of features has a second dimension that is smaller than the first dimension and wherein jointly learning the probability distribution with the set of neural network parameters maximizes a prediction accuracy of the neural network on a prediction task while minimizing a bit rate of the second set of features.

2. The computer-implemented method of claim 1, wherein generating the second set of features comprises:
   generating an intermediate representation of the first set of features;
   encoding the intermediate representation using the probability distribution; and
   generating the second set of features by decoding the intermediate representation using the probability distribution.

3. The computer-implemented method of claim 2, further comprising rounding the first set of features to the nearest integer prior to generating the intermediate representation.

4. The computer-implemented method of claim 1, wherein computing the first set of features comprises:
   computing at least a portion of the first set of features using one or more layers of the neural network that precede a feature layer of the neural network.

5. The computer-implemented method of claim 1, wherein the second set of features is data for training a classifier and the method further comprises:
   training a neural network classifier to detect characteristics of data objects in the dataset based on the second set of features, wherein the neural network classifier is trained by processing the second set of features through one or more layers of the neural network classifier.

6. The computer-implemented method of claim 1, wherein the second set of features has a substantially same measure of informativeness as the first set of features.

7. The computer-implemented method of claim 6, wherein the measure of informativeness is defined by at least one of:
   a measure of precision of computed information in the first set of features; or
   a measure of cross entropy.

8. The computer-implemented method of claim 1, wherein the neural network:
   is implemented on a hardware circuit; and
   is a feed-forward feature detector network.

9. The computer-implemented method of claim 1, further comprising:
   quantizing an output of a feature layer of the neural network prior to the entropy coding.

10. The computer-implemented method of claim 1, wherein the neural network has an objective function that, during training, includes a weight variable for the bit rate, the weight variable affecting a trade-off between maximizing the prediction accuracy and minimizing the bit rate.

11. A computer-implemented method comprising:
    computing, for a dataset, a first set of features that have a first dimension;
    computing, by a first neural network having a set of neural network parameters, a second set of features from the first set of features, the second set of features having a second dimension that is smaller than the first dimension;
    generating third features by adding noise to the second set of features;
    calculating a bit rate of the third features using a probability model having a set of probability model parameters;
    generating predictions by providing the second set of features to a second neural network; and
    adjusting the set of neural network parameters and the set of probability model parameters to maximize an accuracy of the predictions and to minimize the bit rate.

12. The computer-implemented method of claim 11, wherein generating the predictions includes rounding each of the second set of features to a nearest integer before providing the second set of features to the second neural network.

13. The computer-implemented method of claim 11, wherein a weight applied to the bit rate causes the adjusting to favor maximizing the accuracy over minimizing the bit rate.

14. The computer-implemented method of claim 11, wherein a weight applied to the bit rate causes the adjusting to favor minimizing the bit rate over maximizing the accuracy.

15. The computer-implemented method of claim 11, wherein the second set of features has a substantially same measure of informativeness as the first set of features.

16. The computer-implemented method of claim 11, further comprising:
    quantizing the second set of features prior to adding the noise to the second set of features.

17. The computer-implemented method of claim 11, wherein generating the predictions includes generating predicted regression targets or predicted classification labels.

18. The computer-implemented method of claim 11, the probability model represents a probability distribution used by entropy coding techniques.

19. The computer-implemented method of claim 18, wherein the dataset is a first dataset and the method further comprises using the first neural network and the probability distribution to generate compressed features for a second dataset.

20. A system comprising:
    at least one processor; and
    memory storing instructions that, when executed by the at least one processor, cause the system to perform operations including:

computing, from a dataset, a first set of features that have a first dimension, and generating a second set of features from the first set of features using a neural network having a set of neural network parameters and a compression method that compresses the first set of features by entropy coding the first set of features using a probability distribution jointly learned with the set of neural network parameters, wherein the second set of features has a second dimension that is smaller than the first dimension and wherein jointly learning the probability distribution with the set of neural network parameters maximizes a prediction accuracy of the neural network on a prediction task while minimizing a bit rate of the second set of features.

* * * * *